(12) United States Patent
Yang et al.

(10) Patent No.: US 8,624,112 B2
(45) Date of Patent: Jan. 7, 2014

(54) SHELL ASSEMBLY AND ASSEMBLY METHOD THEREOF

(75) Inventors: Nai-Lin Yang, New Taipei (TW); Xiao-Meng Zhou, Shenzhen (CN); Wei Gong, Shenzhen (CN)

(73) Assignees: Shenzhen Futaihong Precision Industry Co., Ltd., Shenzhen (CN); FIH (Hong Kong) Limited, Kowloon (HK)

(*) Notice: Subject to any disclaimer, the term of this patent is extended or adjusted under 35 U.S.C. 154(b) by 25 days.

(21) Appl. No.: 13/298,408

(22) Filed: Nov. 17, 2011

(65) Prior Publication Data

US 2013/0025902 A1    Jan. 31, 2013

(30) Foreign Application Priority Data

Jul. 29, 2011   (CN) .......................... 2011 1 0215786

(51) Int. Cl.
*H05K 5/00*   (2006.01)

(52) U.S. Cl.
USPC ... 174/50; 439/135; 361/679.02; 361/679.01; 312/223.1

(58) Field of Classification Search
USPC ......................... 174/50; 439/135; 361/679.01; 312/223.1
See application file for complete search history.

(56) References Cited

U.S. PATENT DOCUMENTS 7,530,822 B2 *   5/2009   Liao .............................. 439/135
8,023,264 B2 *   9/2011   Shen et al. ............... 361/679.58

* cited by examiner

*Primary Examiner* — Dhirubhai R Patel
(74) *Attorney, Agent, or Firm* — Altis Law Group, Inc.

(57) ABSTRACT

A shell assembly includes a first shell having a plurality of elastic sheets mounted, and a second shell defining a plurality of securing grooves. The elastic sheets are capable of deforming and latching in the securing grooves, detachably latching the first shell and the second shell. An assembly method for assembling the shell assembly is also disclosed.

10 Claims, 4 Drawing Sheets

SHELL ASSEMBLY AND ASSEMBLY METHOD THEREOF

BACKGROUND

1. Technical Field

The present disclosure relates to a shell assembly and an assembly method thereof.

2. Description of the Related Art

Portable electronic devices such as mobile phones usually include two shells assembled together to secure a display screen between the shells. The two shells may be fixed with each other by heating a thermal bonding film positioned therebetween. However, heating the thermal bonding film makes the assembly process more complex. Furthermore, if the display screen needs to be replaced, one of the two shells will have to be damaged to remove the display screen.

Therefore, there is room for improvement within the art.

BRIEF DESCRIPTION OF THE DRAWINGS

Many aspects of the present shell assembly and assembly method thereof can be better understood with reference to the following drawings. The components in the drawings are not necessarily drawn to scale, the emphasis instead being placed upon clearly illustrating the principles of the present shell assembly and assembly method thereof. Moreover, in the drawings, like reference numerals designate corresponding parts throughout the several views.

DETAILED DESCRIPTION

Figure 1:
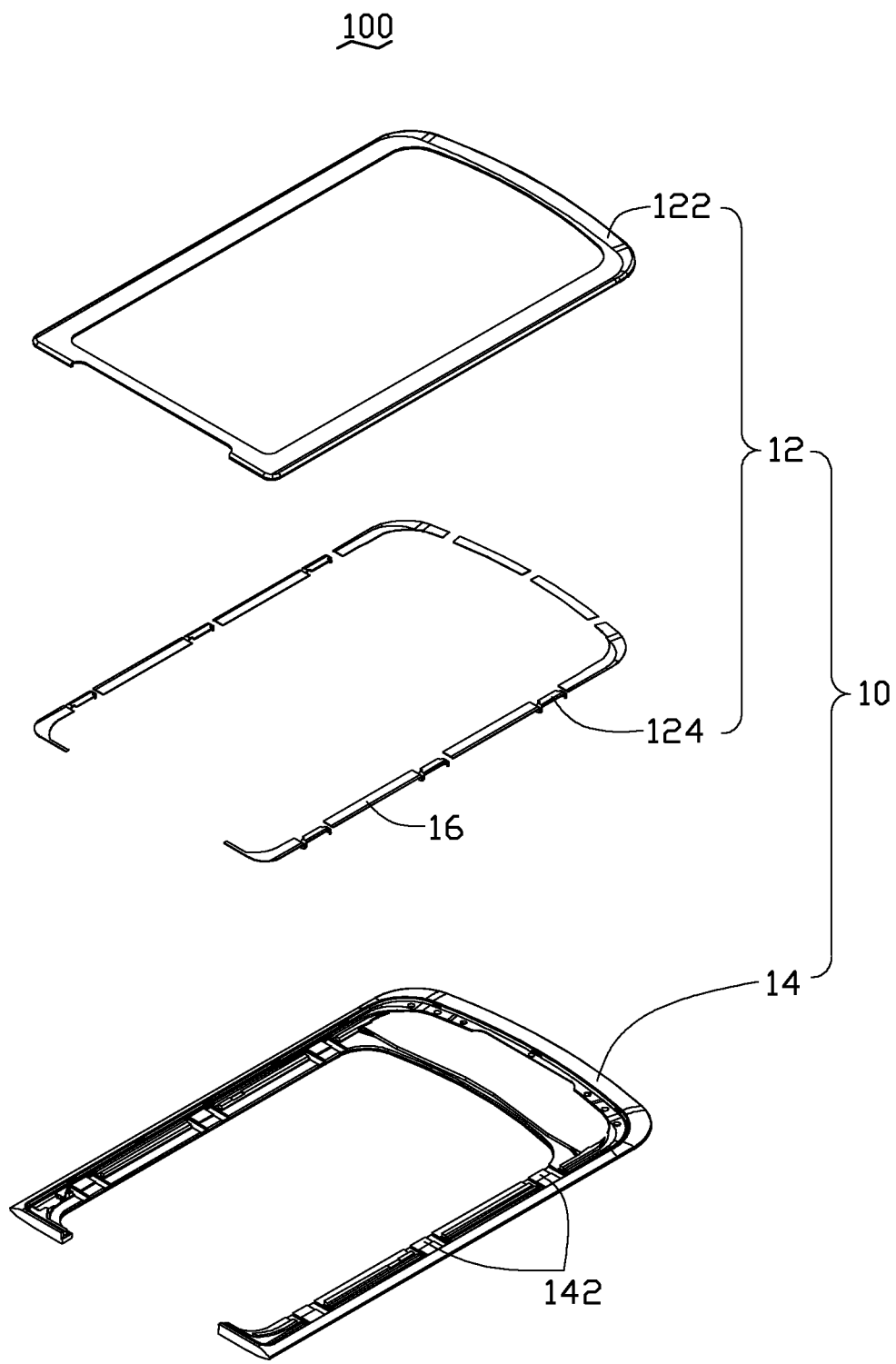
FIG. 1 is an exploded view of a shell assembly according to an exemplary embodiment.
Figure 3:
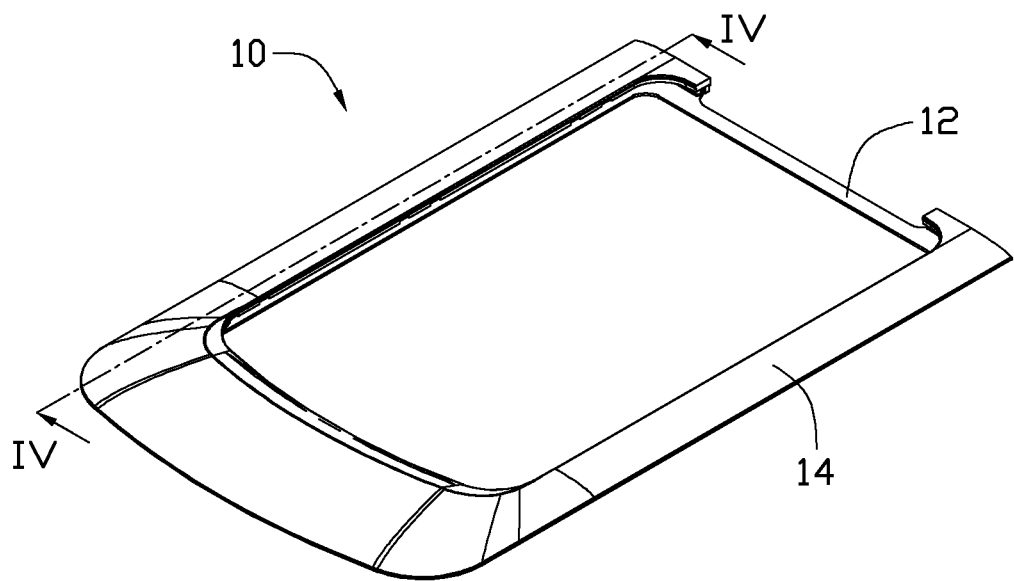
FIG. 3 is an assembled view of the shell assembly shown in FIG. 1.
Figure 4:
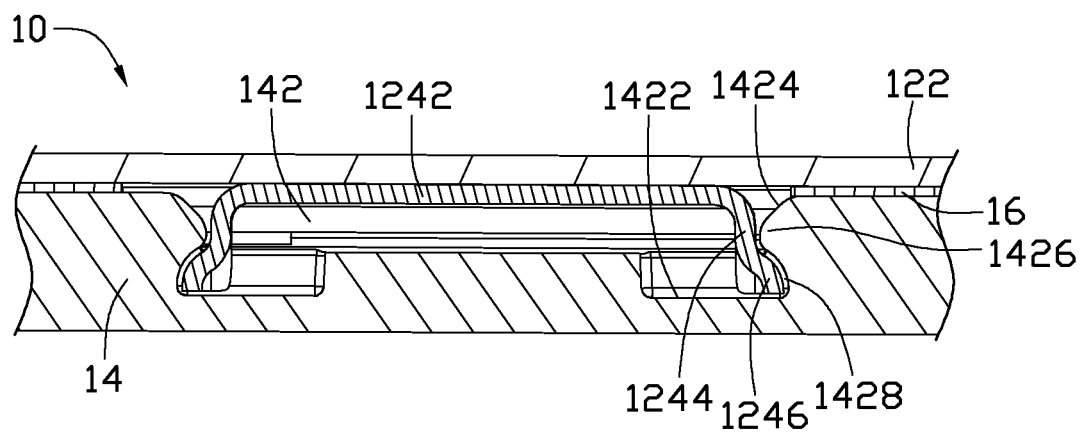
FIG. 4 is a partial cross-sectional view of the shell assembly shown in FIG. 3 along line IV-IV.

FIGS. 1, 3 and 4 show an exemplary shell assembly 10 for use in portable electronic device 100 such as a mobile phone. The shell assembly 10 includes a first shell 12 and a second shell 14 mounted with the first shell 12. Adhesive members 16 (such as double-faced adhesive tapes) are provided to adhere the first shell 12 to the second shell 14. A display screen can be mounted between the first shell 12 and the second shell 14.

Figure 2:
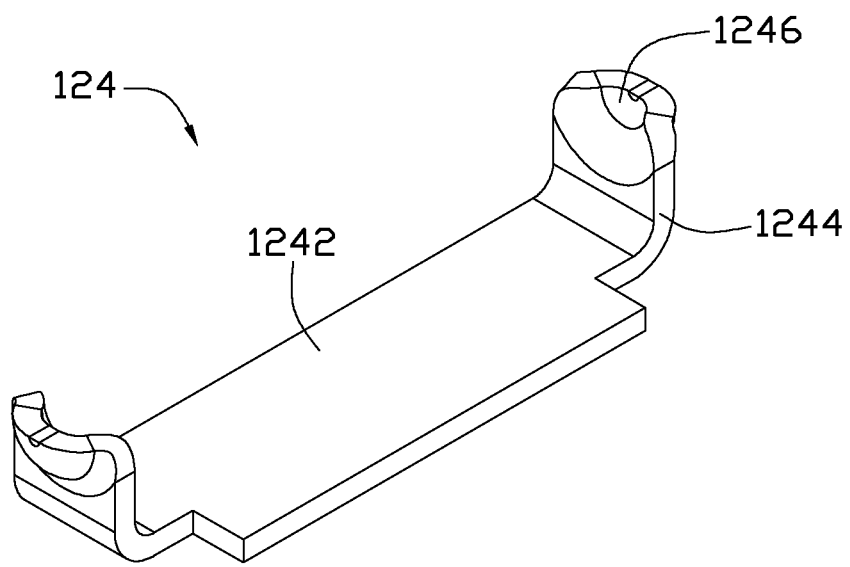
FIG. 2 is an enlarge view of an elastic sheet shown in FIG. 1.

The first shell 12 includes a shell body 122 and six elastic sheets 124. The shell body 122 and the elastic sheets 124 can be made of metal materials such as stainless steel. The elastic sheets 124 can be fixed to the shell body 122 by welding. FIG. 2 further shows each elastic sheet 124 including a securing section 1242, two opposite connecting sections 1244, and two opposite latching sections 1246. The securing section 1242 is used for securing the elastic sheet 124 to the shell body 122. The two connecting sections 1244 curvedly extending at a substantially right angle from two opposite ends of the securing section 1242, respectively. Each latching section 1246 extends from the end of the respective connecting section 1244 distal to the securing section 1242. The latching section 1246 is used for latching with the second shell 14.

As shown in FIG. 4, the second shell 14 defines securing grooves 142 corresponding to the elastic sheets 124. Each securing groove 142 is enclosed by a bottom wall 1422 and a peripheral wall 1424 connecting to the bottom wall 1422. The peripheral wall 1424 has two opposite latching portions 1426 protruding for latching with the latching sections 1246, and thus defines two latching slots 1428 between the latching portions 1426 and the bottom wall 1422. When the elastic sheet 124 is latched on the second shell 14, the latching sections 1246 are latched by the latching portions 1426 and into the latching slots 1428.

During assembly of the shell assembly 10, the securing section 1242 can be welded to the shell body 122, fixing each elastic sheet 124 to the shell body 122. The elastic sheets 124 are spaced from each other. The adhesive members 16 are attached between each two adjacent sheets 124 and onto the shell body 122. The first shell 12 is aligned with the second shell 14 with the elastic sheets 124 aligned to face the securing grooves 142. The first shell 12 is pressed to fit with the second shell 14, urging the elastic sheets 124 to be deformed by resisting of the latching portions 1426 and secured into the securing grooves 142. At this time, the elastic sheets 124 and the first shell 12 are latched to the second shell 14 by the latching between the latching sections 1246 and the latching portions 1426. The first shell 12 can be fixed to the second shell 14 by pressing the shell body 122 against the second shell 14, until the adhesive members 16 adhere the two shells 12, 14 together. The assembly of the shell assembly 10 is completed.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A shell assembly, comprising:
a first shell having a shell body and a plurality of elastic sheets, each of said elastic sheets including a securing section, two opposite connecting sections extending at a substantially right angle from the securing section, and two opposite latching sections extending from ends of the two connecting sections distal to the securing section, the securing section of each of said elastic sheets welded to the shell body; and
a second shell defining a plurality of securing grooves, each of the securing grooves enclosed by a bottom wall and a peripheral wall connecting to the bottom wall, the peripheral wall having two opposite latching portions protruding from the peripheral wall, the latching sections of the elastic sheets capable of deforming and latching with the latching portions, thereby detachably latching the first shell and the second shell.

2. The shell assembly as claimed in claim 1, wherein the shell assembly further comprises adhesive members, the adhesive members are attached on the first shell and adhered between the second shell and the first shell.

3. The shell assembly as claimed in claim 1, wherein the elastic sheets are welded to the first shell.

4. The shell assembly as claimed in claim 1, wherein the first shell and the elastic sheet are made of metal materials.

5. The shell assembly as claimed in claim 1, wherein the peripheral wall defines two latching slots between the latching portions and the bottom wall; when the elastic sheets are latched on the second shell, the latching sections are latched by the latching portions and into the latching slots.

6. An assembly method for assembling a shell assembly, comprising:
providing a first shell and a plurality of elastic sheets, the first shell having a shell body, each of said elastic sheets including a securing section, two opposite connecting sections extending at a substantially right angle from the securing section, and two opposite latching sections extending from ends of the two connecting sections distal to the securing section;

welding the securing section of each of the elastic sheets to the first shell;

providing a second shell defining a plurality of securing grooves corresponding to the elastic sheets, each of the securing grooves enclosed by a bottom wall and a peripheral wall connecting to the bottom wall, the peripheral wall having two opposite latching portions protruding from the peripheral wall;

pressing the first shell and the second shell towards with each other, latching the latching sections of the elastic sheets into the securing grooves to latch with the latching portions.

7. The assembly method as claimed in claim 6, further comprising:

providing adhesive members;

attaching each adhesive member between each two adjacent sheets and onto the first shell before pressing the first shell and the second shell;

after latching the elastic sheets into the securing grooves, further pressing the first shell against the second shell, until the adhesive members adhere the first and second shells as a whole.

8. The assembly method as claimed in claim 6, further comprising welding the elastic sheet to the first shell.

9. The assembly method as claimed in claim 6, wherein the first shell and the elastic sheets are made of metal materials.

10. The assembly method as claimed in claim 6, wherein the peripheral wall defines two latching slots between the latching portions and the bottom wall; when the elastic sheets are latched on the second shell, the latching sections are latched by the latching portions and into the latching slots.

* * * * *